Patented Aug. 14, 1945

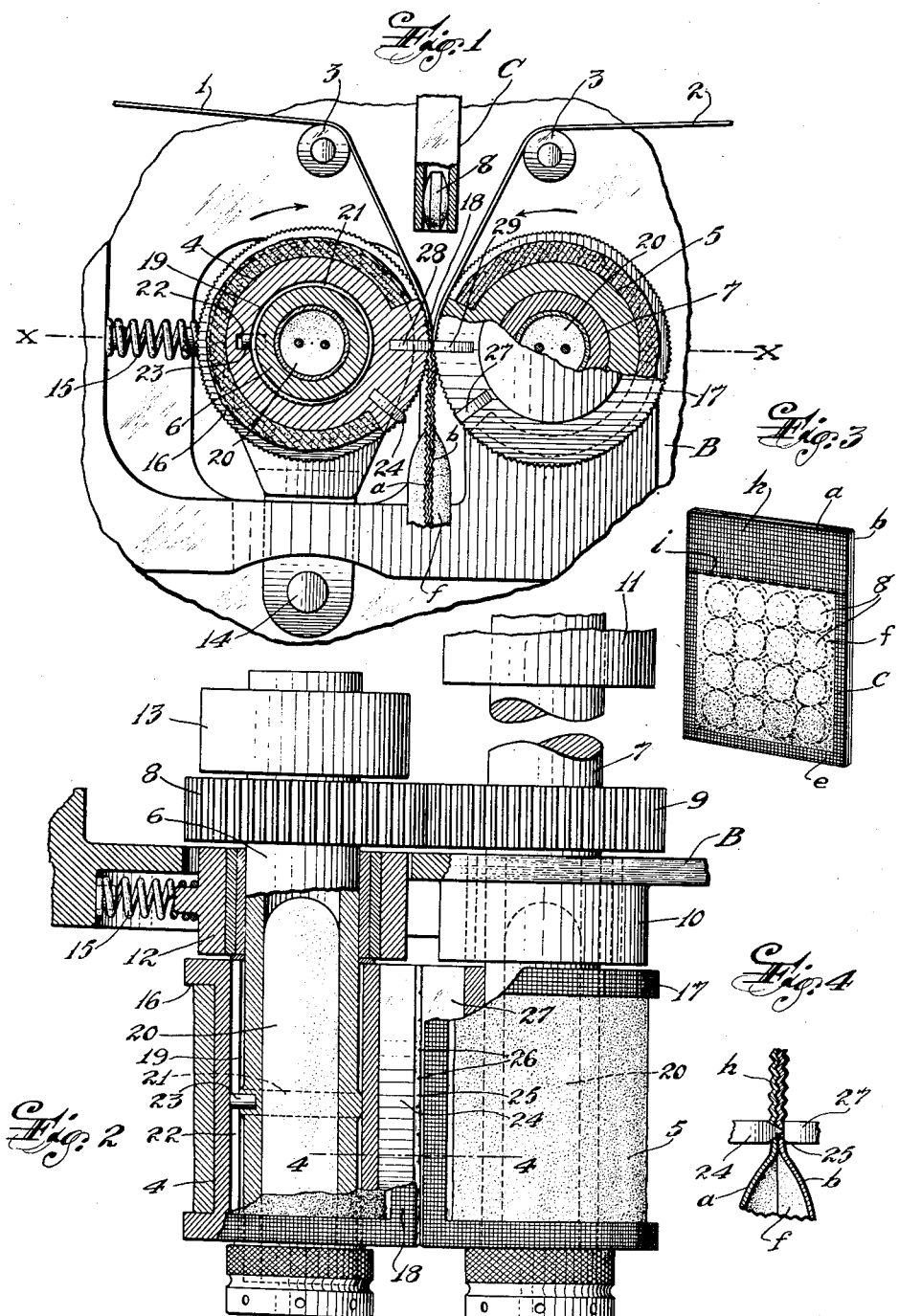

2,382,175

UNITED STATES PATENT OFFICE 2,382,175

SEALING, CRIMPING, AND SCORING ROLLERS FOR PACKAGING MACHINES

Leroy L. Salfisberg, South Orange, N. J., assignor to Ivers-Lee Company, Newark, N. J., a corporation of Delaware Application December 12, 1942, Serial No. 468,762

2 Claims. (Cl. 93—3)

This invention relates in general to packaging machines of the type which includes rollers that are adapted to receive and seal and crimp between them two or more opposed layers or strips of flexible packaging material so as to form commodity-containing envelopes or bags in a continuous operation. A machine of this general character is described in my United States Patent No. 2,083,617 dated June 15, 1937.

More specifically the invention contemplates improvements in such rollers especially, although not exclusively, intended for use in making packages formed of thin sheet material such as "Cellophane" and "Pliofilm" and particularly sheet material which is itself thermoplastic and can be softened by heat or which has a thermoplastic, fusible or adhesive coating such that the layers can be caused to adhere together by application of heat and pressure or pressure alone to form a seal.

It is important, especially where the areas to be sealed and crimped or corrugated are large, that the surfaces of the rollers shall be in exact parallelism at the zone of contact thereof with the packaging material to ensure uniform pressure upon and sealing of the layers of packaging material throughout said zone of contact.

Therefore one object of my invention is to provide a novel and improved construction and combination of rollers of the general character described and mounting and driving means therefor, such that the peripheral surfaces of said rollers shall always be exactly parallel to each other in their common axial plane which passes through the zone of contact of the rollers with the packaging material.

Other objects, advantages and results will be brought out by the following description in conjunction with the accompanying drawing in which Figure 1 is a fragmentary front elevational view partially in section of one form of sealing and crimping mechanism for packaging apparatus embodying my invention.

Figure 2 is a top plan view of the mechanism with portions broken away and shown in horizontal section.

Figure 3 is a perspective view of one type of package for the manufacture of which the sealing and crimping mechanism may be utilized, and Figure 4 is an enlarged fragmentary vertical sectional view on the line 4—4 of Figure 2.

Specifically describing the illustrated embodiment of the invention, the reference characters 1 and 2 designate two layers or strips of packaging material, for example "Pliofilm," "Cellophane," metal foil, paper or the like, but preferably thermoplastic material or material having a thermoplastic coating on one side thereof so that the two layers can be secured together under simultaneous application of heat and pressure. These strips 1 and 2 are led from a suitable source of supply over guide rollers 3 to a sealing and crimping mechanism which includes rollers 4 and 5 that receive the layers between them.

Each roller 4 and 5 frictionally contacts with one of the layers 1 and 2 so as to press said layer into contact with the other layer, the rollers being mounted to rotate on approximately parallel axes by the respective shafts 6 and 7 which are geared together by pinions 8 and 9 so that the rollers will rotate in opposite directions. One of the shafts, in the present instance the shaft 7, is driven from any suitable source of power. The shafts may be mounted in any suitable manner, but as shown the shaft 7 is journaled in bearings 10 and 11 which may form a part of the main frame of the packaging machine, while the shaft 6 is journaled in two bearings 12 and 13 that preferably are connected integrally and pivotally mounted at 14 on the frame B of the machine so that the roller 4 may move toward and from the roller 5. Preferably a compression spring 15 is interposed between one of the bearings, specifically the bearing 12, and the frame B of the machine so as to normally influence the rollers into peripheral contact with each other.

The rollers are shown are specifically designed to manufacture a package like that shown in Figure 3 which comprises two pieces a and b of packaging material sealed together along their longitudinal edges at c and across one transverse edge e to form an article-receiving compartment f in which articles such as tablets g may be packaged. The compartment f if sealed along the other transverse edge of the layers a and b as indicated at h and a tear-line of perforations i is provided for facilitating removal of the sealed portion h to open the compartment f.

The rollers 4 and 5 have complemental registering recesses 16 to provide clearance spaces between them for the articles f that are disposed between the layers of packaging material, the shape of the recesses corresponding to the shape of the compartment f. The recesses are surrounded on the peripheral surfaces of the rollers by roughened, corrugated or serrated zones for crimping or corrugating and pressing together the layers 1 and 2 to form the sealed portions c, e and h of the package. As shown, the rollers have circumferential serrated zones 17 at their ends to form the sealed marginal portion c of the package, and transverse zones 18 which form the sealed portions e and h of the package.

Where the material of the layers is heat-sealable the rollers are heated by suitable electric heating devices 20 of known character, for example, as shown in my Patent No. 2,083,617, which heat the packaging material or the thermoplastic coating thereon at the same time pressure is applied to the layers by the serrated surfaces 17 and 18 of the rollers.

The articles g will, of course, be placed in the compartments f before the sealed portions h of the packages are formed, and any suitable article-depositing mechanism may be utilized. In the drawing, a discharge nozzle of such mechanism is designated C and the articles g may be dropped from this nozzle under control of suitable mechanism into the space between the layers 1 and 2 so that as the rollers rotate in the direction of the arrows shown in Figure 1, the articles will be enclosed between the layers of the material.

It will be observed from the foregoing that it is necessary to maintain proper and uniform contact of the rollers with the layers of packaging material and further to ensure proper meshing or contact of the serrations or corrugations of the rollers with each other. For this purpose I propose to mount at least one of the rollers 4 and 5 so that it may tilt in axial planes thereof to ensure that the peripheral surfaces of the rollers shall always be exactly parallel to each other in their common axial plane which passes through the zone of contact of the rollers with the packaging material. For clearness this axial plane is designated X—X in Figure 1 of the drawing. More specifically, at least one of the rollers, in the present instance the roller 4, has a coaxial longitudinal opening 19 therethrough through which passes the shaft 6, and the shaft has a narrow annular bearing rib 21 which contacts with the inner walls of the opening 19 intermediate the length of the roller, preferably midway of the length of said roller. With this construction it will be seen that the roller 4 may tilt about the rib 21 in axial planes of the roller, the axis of tilting being perpendicular to said axial plane X—X and to the normal axis of rotation of the roller, namely, the axis of rotation of the shaft 6.

For causing the roller positively to rotate with the shaft the roller may have a longitudinal groove 22 on its inner surface in which is disposed a pin 23 which projects from the shaft in the general plane of the bearing rib 21.

It will be understood that if desired the bearing rib 21 could be placed on the inner surface of the opening 19 through the roller instead of upon the shaft.

With this construction it will be observed that the peripheral surfaces of the rollers may accurately contact with each other throughout their lengths and with uniform pressure along the zone of contact of the rollers with the layers of packaging material so that the layers will be accurately and uniformly sealed together and crimped.

It is desirable in many instances to provide the packages with the tear-line i as the packages are formed in the sealing and crimping mechanism. For this purpose one of the rollers may have a knife blade 24 extending longitudinally of the roller in an axial plane thereof and secured in a groove in the roller. As shown, the knife blade is disposed in the transverse corrugated zone 18 of the roller and the edge of the blade has cutting portions 25 and notches 26 alternately arranged.

The other roller 5 has a platen 27 which comprises a bar secured in a longitudinal groove in the roller in such a position that it will be directly opposite the knife blade 24 of the roller 4 when the knife blade contacts with the corresponding layer of packaging material in the plane X—X. The surface of the platen 27 is substantially flat and smooth and the parts are so related that when the knife blade and platen come into juxtaposition, the cutting edges 25 of the knife blade will be pressed through the layers of packaging material against or into abutting contact with the platen as shown in Figure 4 so as to form slits. The slits will be separated from each other by virtue of the notches 26 in the knife blade which will prevent cutting of the layers of packaging material at the zones juxtaposed to said notches.

Where the layers 1 and 2 are thermoplastic or have thermoplastic coatings and at least one of the rollers is heated, the knife blade and platen will be heated so that the thermoplastic material will be softened along the edges of the slits formed by the knife blade to thereby seal the layers together along the edges of the slits.

While the packages may be formed in a continuous chain and separated by additional mechanism, if desired the roller 4 may have another knife blade 28 and the roller 5 may have another platen 29 which will cooperate with each other in a manner similar to the cooperation of the knife blade 24 and platen 27 to sever the layers of packaging material and separate the packages from each other. Of course the knife blade 28 preferably will have a continuous cutting edge without notches similar to the notches 26.

Many modifications and changes in the construction of the apparatus within the spirit and scope of the invention will occur to those skilled in the art, specifically the manner of mounting the rollers, the shape and arrangement of the sealing and crimping zones of the rollers, the arrangement of the knife blades and platens, etc.

What I claim is:

1. In a packaging apparatus, a pair of rollers to receive layers of packaging material between their peripheries, portions of the peripheral surface of each roller being formed to engage and press one of said layers of packaging material into contact with the other layer and each roller having serrations on its periphery to intermesh with the serrations on the other roller, mechanism mounting said rollers for rotation about approximately parallel axes including means rotatably mounting one of said rollers, a rotatable shaft whose axis is parallel to the axis of rotation of said roller, means mounting the other of said rollers on said shaft to tilt relatively to said shaft in axial planes of the roller about axes transverse to its axis of rotation, means for yieldingly influencing said rollers into peripheral contact with each other, and means for synchronously rotating said rollers in opposite directions.

2. In a packaging apparatus, a pair of rollers to receive layers of packaging material between their peripheries, portions of the peripheral surface of each roller being formed to engage and press one of said layers of packaging material into contact with the other layer and each roller having serrations on its periphery to intermesh with the serrations on the other roller, a pair of rotatable shafts whose axes are parallel and one of which is movable toward and from the other, means mounting one of said rollers on and to rotate with each of said shafts including cooperatively engaging portions on at least one of said rollers and its corresponding shaft to permit said roller to tilt in axial planes thereof relatively to said shaft, means for causing said shafts to rotate synchronously in opposite directions and spring means normally yieldingly pressing said movable shaft toward the other to maintain yielding contact between said rollers and said packaging material.

LEROY L. SALFISBERG.